Aug. 20, 1946.　　　P. B. REEVES　　　2,406,253
FRICTION-TIPPED BELT BLOCK
Filed Oct. 1, 1943
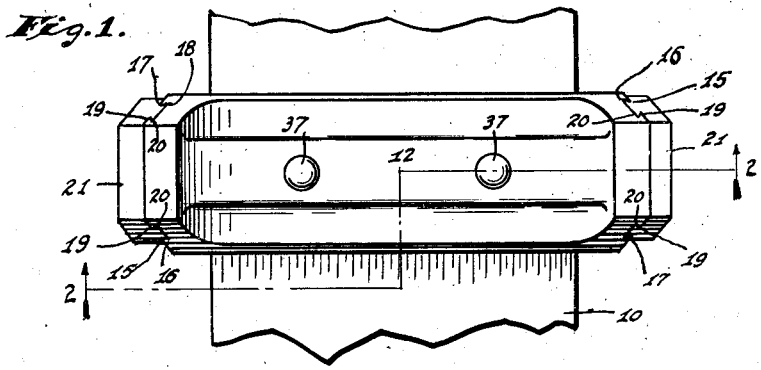
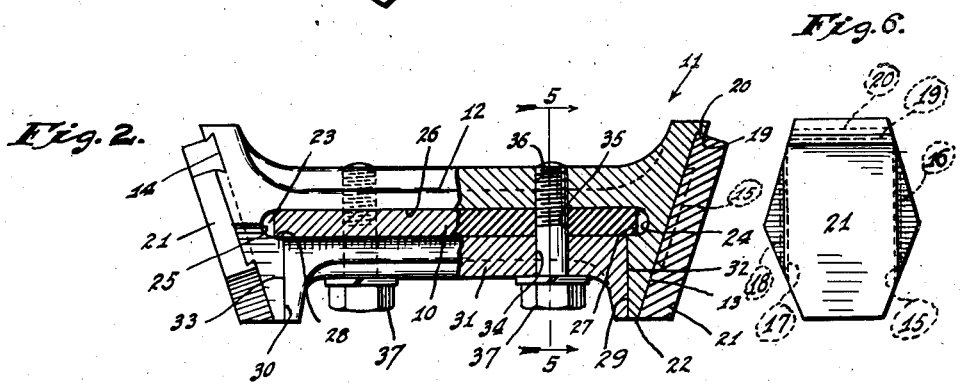
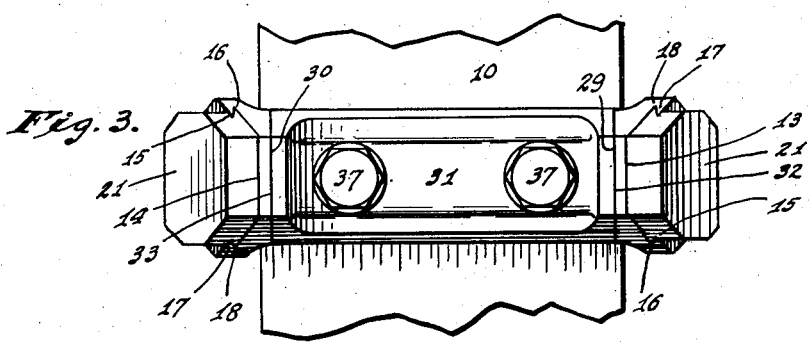
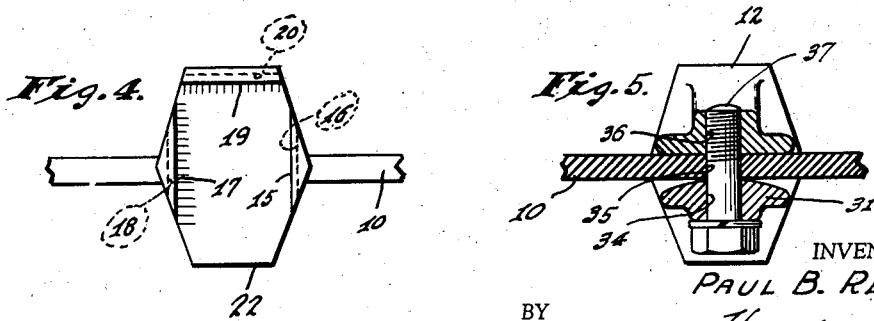
INVENTOR.
PAUL B. REEVES,
BY　Hood & Hahn
ATTORNEYS Patented Aug. 20, 1946

2,406,253

UNITED STATES PATENT OFFICE 2,406,253

FRICTION-TIPPED BELT BLOCK

Paul B. Reeves, Columbus, Ind., assignor to Reeves Pulley Company, Columbus, Ind., a corporation of Indiana Application October 1, 1943, Serial No. 504,541

2 Claims. (Cl. 74—236)

The present invention relates to belt blocks, and more particularly to that type of belt block which is used to provide transverse stiffness in connection with a pulling web which is inherently transversely flexible, and which is provided, at its opposite ends, with allochirally inclined surfaces to which are suitably secured friction pads for cooperation with the inclined surfaces of V-pulleys.

The primary object of the invention is to provide a suitable metal block of the type here under consideration. A further object of the invention is to provide, in connection with such a block, novel and effective means for securing the friction pads to the opposite ends of such a block. A further object of the invention is to provide a novel and efficient means for securing such a block to a belt body. Further objects of the invention will appear as the description proceeds.

To the accomplishment of the above and related objects, my invention may be embodied in the form illustrated in the accompanying drawing, attention being called to the fact, however, that the drawing is illustrative only, and that change may be made in the specific construction illustrated and described, so long as the scope of the appended claims is not violated.

Fig. 1 is a top plan view of a stiffener block, constructed in accordance with the present invention, and associated with a section of a belt body;

Fig. 2 is a section taken substantially upon the line 2—2 of Fig. 1 and looking in the direction of the arrows;

Fig. 3 is a bottom plan view of the illustrated embodiment of the invention;

Fig. 4 is an end elevation of one face of the main block body;

Fig. 5 is a section taken substantially upon the line 5—5 of Fig. 2 and looking in the direction of the arrows; and Fig. 6 is a view similar to Fig. 4 but showing a friction pad in place upon the block end.

Stiffener blocks, intended for the purpose for which the device of the present invention is intended, have of course long been used in connection with transversely flexible belt bodies. The standard construction, however, has always been a two-piece wooden block, the two block pieces being clamped upon opposite surfaces of the belt body by means of bolts passing through the two block sections and the belt body, and nuts set upon the bolts. Various means for securing friction pads to the ends of the block sections have been attempted; but standard commercial practice has been to nail and glue a pad to each end of each section of each block.

There are obvious disadvantages to such a construction, including the necessity for separately securing four pads to the ends of the two sections of each block asembly, the difficulty of performing the nailing operation, the impossibility of bringing the corresponding ends of the two sections of wooden block into true coplanar relation, and the fact that the nail heads will eventually be exposed by pad wear.

By the present invention I believe that I have overcome not only the mentioned difficulties, but many, if not all, of the other disadvantages of the stiffener block structure which has been used according to standard practice in the past.

Referring more particularly to the drawing, it will be seen that I have illustrated a fragment of a belt body 10 of any standard construction, together with a stiffener block assembly, indicated generally by the reference numeral 11, operatively associated therewith. The assembly 11 includes a main body element or beam 12 which is formed at its opposite ends to provide allochirally angularly related faces 13 and 14. As is clearly to be perceived from an inspection of the drawing, the faces 13 and 14 are equiangularly inclined inwardly and toward each other. The angle of inclination selected is substantially the angle of inclination of the faces of the V-pulleys with which the belt is to be used.

Since the faces 13 and 14 are, in all respects, allochiral, only one will be described. Each of such faces is provided, at its right-hand edge, with a vertically extending ledge or lip or blade 15, which is undercut as at 16; and each of said faces is further provided with a second, substantially parallel, similar ledge 17, undercut as at 18, adjacent its opposite edge, the ledges 15 and 17 facing each other in the manner clearly illustrated in Fig. 4. Each of the faces 13 and 14 is further provided, adjacent its upper edge, with a similar ledge 19, undercut as at 20, and extending in the direction of belt movement. It will be seen that the line of the ledge 19 intersects the substantially parallel lines of the ledges 15 and 17 and, in the preferred embodiment of the invention, those lines will intersect substantially at right-angles.

A pad 21 of suitable friction material and of desired configuration, is adapted to be associated with each of the faces 13 and 14. The dimension of the pad 21, in the direction of belt movement, is slightly greater than the distance between the ledges 15 and 17, and slightly less than the distance between the bases of the undercuts 16 and 18. The faces 13 and 14 being unobstructed at their lower edges 22, it will be clearly perceived that the pads 21 can be laid upon those surfaces, adjacent their lower edges 22, and then can be forced upwardly, sliding upon the surfaces 13 and 14, in such a fashion that the ledges 15 and 17 will cut grooves in the leading and trailing edges of the pads 21; and it will be further perceived that the pads may be so strongly forced against the sharpened ledge 19 that said ledge will be embedded in the upper edge of the associated pad. Thus, after the pad has been forced into position, it will be seen that the pad material will overlie and underlie each of the ledges 15, 17, and 19.

A suitable glue or cement will be applied either to the inner pad surface or to the block face, or to both, before the pad is forced into place.

For facilitating the association of the block of the present invention with the belt body, I form the inner surface of the beam 12 to provide a socket 23 which is defined by end walls 24 and 25, spaced apart a distance somewhat greater than the transverse dimension of the belt with which the block is to be associated, a substantially continuous base wall 26 joining the end walls 24 and 25, and a pair of further walls 27 and 28 projecting toward each other, respectively, from the end walls 24 and 25, in substantial parallelism with the base wall 26. The walls 27 and 28 terminate at points spaced from each other a distance slightly less than the transverse dimension of the belt with which the block is to be associated. Thus it will be seen that, by slightly transversely distorting the belt body, the opposite edges of that body can be inserted between the wall 26 and the walls 27 and 28, respectively, whereby the beam 12 is lightly held in position upon the belt body.

The wall 27 merges in a vertical wall 29, substantially perpendicular to the wall 26, and facing inwardly; while the wall 28 similarly merges in an inwardly facing vertical wall 30. A closure plate or bar 31 for the socket 23 is formed at its opposite ends with surfaces 32 and 33 adapted to mate, respectively, with the walls 29 and 30, so that the closure 31, being slidably received between the walls 29 and 30, can be shifted toward and away from the wall 26 of the socket 23, and will cooperate with said wall 26 to clamp the block assembly in fixed position upon a belt of any thickness within a considerable range. The closure 31 is formed with one or more smooth bores 34 adapted to register with a like number of perforations 35 preliminarily formed in the belt body 10, and with a like number of tapped holes 36 in the beam 12, for the reception of clamping bolts 37, whereby the closure 31 can be drawn into clamping relationship with the belt body 10.

I claim as my invention:

1. For use with a transversely-flexible belt body, a stiffener block comprising a rigid main body formed with a socket adapted to receive a portion of said belt body, said socket being defined by opposite end walls spaced from each other a distance greater than the transverse dimension of the belt with which said block is to be used, a substantially continuous base wall joining said end walls, and a pair of walls extending, respectively, from said end walls toward each other in substantial parallelism with said base wall, said last-named walls terminating at points spaced from each other a distance slightly less than said belt dimension, a closure for said socket receivable between the termini of said last-named walls for retaining said belt body portion in said socket, and means for securing said closure in place in said socket in clamping engagement with the said belt body portion.

2. For use with a transversely-flexible belt body, a stiffener block comprising a rigid main body formed with a socket adapted to receive a portion of said belt body, said socket being defined by opposite end walls spaced from each other a distance greater than the transverse dimension of the belt with which said block is to be used, a substantially continuous base wall joining said end walls, and a pair of walls extending, respectively, from said end walls toward each other in substantial parallelism with said base wall, said last-named walls terminating at points spaced from each other a distance slightly less than said belt dimension, and means engageable with said main body and with said belt body portion to hold said main body in position on said belt body.

PAUL B. REEVES.